United States Patent
Saikkonen et al.

(10) Patent No.: US 10,697,672 B2
(45) Date of Patent: Jun. 30, 2020

(54) STORAGE UNIT AND TEMPERING SYSTEM FOR A STORAGE UNIT

(71) Applicant: BITZER Kuehlmaschinenbau GmbH, Sindelfingen (DE)

(72) Inventors: Kari Saikkonen, Seinaejoki (FI); Franck Repentin, Herrenberg (DE); Axel Friedrich, Leipzig (DE); Andreas Becker, Halle (DE)

(73) Assignee: BITZER Kuehlmaschinenbau GmbH, Sindelfingen (DE)

( * ) Notice: Subject to any disclaimer, the term of this patent is extended or adjusted under 35 U.S.C. 154(b) by 29 days.

(21) Appl. No.: 15/460,925

(22) Filed: Mar. 16, 2017

(65) Prior Publication Data
US 2017/0241678 A1    Aug. 24, 2017

Related U.S. Application Data

(63) Continuation of application No. PCT/EP2014/070062, filed on Sep. 19, 2014.

(51) Int. Cl.
*F25B 27/00* (2006.01)
*F25B 47/02* (2006.01)
(Continued)

(52) U.S. Cl.
CPC ............. *F25B 27/00* (2013.01); *F25B 40/02* (2013.01); *F25B 47/022* (2013.01);
(Continued)

(58) Field of Classification Search
CPC .... F25B 47/022; F25B 27/00; F25B 2327/00; F25B 2327/001; F25B 2400/0403;
(Continued)

(56) References Cited

U.S. PATENT DOCUMENTS 4,976,464 A * 12/1990 Swenson ............. F24D 11/0214
    237/2 B
5,226,594 A * 7/1993 Swenson ................. F24D 17/02
    122/13.3

(Continued)

*Primary Examiner* — Henry T Crenshaw
*Assistant Examiner* — Kamran Tavakoldavani
(74) *Attorney, Agent, or Firm* — Reinhart Boerner Van Deuren P.C.

(57) ABSTRACT

For creating a storage unit comprising a container housing enclosing a storage volume for receiving freight and a gaseous medium surrounding said freight, said storage unit further comprising a tempering system provided with a tempering unit associated with said storage volume for maintaining a flow of said gaseous medium circulating in said storage volume and passing through said tempering unit in order to be maintained at a defined or set temperature, said tempering unit comprising an internal heat exchanger arranged in said flow of gaseous medium passing through said tempering unit, said tempering system being provided with a refrigerant circuit comprising said internal heat exchanger, an external heat exchanger exposed to ambient air surrounding said container housing which operates reliably and cost efficient under the aforementioned condition, as well as a compressor unit for compressing refrigerant, and said tempering system being further provided with an engine for driving said compressor unit in an independent power source mode and said tempering system being further provided with an electric motor/generator unit mechanically coupled to said compressor unit, and said compressor unit and said motor/generator unit being commonly driven by said engine in said independent power source mode.

44 Claims, 7 Drawing Sheets

(51) Int. Cl.
| | |
|---|---|
| *F25D 11/00* | (2006.01) |
| *F25B 40/02* | (2006.01) |
| *F25D 17/06* | (2006.01) |
| *F25D 21/08* | (2006.01) |
| *F25D 29/00* | (2006.01) |
| *F25D 31/00* | (2006.01) |
| *F25B 40/00* | (2006.01) |

(52) U.S. Cl.
CPC ............ F25D 11/003 (2013.01); F25D 17/06 (2013.01); F25D 21/08 (2013.01); F25D 29/003 (2013.01); F25D 31/005 (2013.01); *F25B 40/00* (2013.01); *F25B 2327/00* (2013.01); *F25B 2327/001* (2013.01); *F25B 2400/0403* (2013.01); *F25B 2400/0411* (2013.01); *F25B 2600/0262* (2013.01); *F25D 2400/02* (2013.01); *Y02B 40/32* (2013.01)

(58) Field of Classification Search
CPC ...... F25B 2400/0411; F25B 2600/0262; F25B 40/00; F25D 11/003; B60H 1/3222; B60H 1/3226

USPC ....... 62/323.3; 417/221, 223; 418/55.1, 55.2
See application file for complete search history.

(56) References Cited

U.S. PATENT DOCUMENTS

| | | | |
|---|---|---|---|
| 6,321,550 B1* | 11/2001 | Chopko | F25B 27/00 62/196.2 |
| 2001/0029747 A1 | 10/2001 | Gaul | |
| 2002/0187052 A1* | 12/2002 | Adaniya | F04B 17/05 417/223 |
| 2003/0213255 A1* | 11/2003 | Nosaka | B60H 1/323 62/175 |
| 2004/0052647 A1* | 3/2004 | Kanai | F04B 27/0895 417/222.1 |
| 2004/0184923 A1* | 9/2004 | Iwanami | B60H 1/3223 417/221 |
| 2007/0137223 A1* | 6/2007 | Brekke | A23L 3/362 62/64 |
| 2011/0219797 A1* | 9/2011 | Taguchi | B60H 1/3208 62/129 |
| 2014/0137590 A1 | 5/2014 | Chopko et al. | |

* cited by examiner

STORAGE UNIT AND TEMPERING SYSTEM FOR A STORAGE UNIT

CROSS-REFERENCE TO RELATED PATENT APPLICATION

This application is a continuation of International application number PCT/EP2014/070062 filed on Sep. 19, 2014.

This patent application claims the benefit of International application No. PCT/EP2014/070062 of Sep. 19, 2014 the teachings and disclosure of which are hereby incorporated in their entirety by reference thereto.

BACKGROUND OF THE INVENTION

The invention relates to a storage unit comprising a container housing enclosing a storage volume for receiving freight and a gaseous medium surrounding said freight, that storage unit further comprising a tempering system provided with a tempering unit associated with said storage volume for maintaining a flow of said gaseous medium circulating in said storage volume and passing through said tempering unit in order to be maintained at a defined or set temperature.

In particular said storage units are transport storage units used for transporting or shipping freight.

Such storage units are used in a wide variety of climatic zones of the globe and under harsh conditions.

The freight to be stored in such storage units is mostly perishable, such as, for example, frozen fish, meat, fruit or chocolate or flowers.

It is the object of a present invention to create a storage unit which operates reliably and cost efficient under the aforementioned conditions.

SUMMARY OF THE INVENTION

This object is solved by a storage unit comprising a container housing enclosing a storage volume for receiving freight and a gaseous medium surrounding said freight, said storage unit further comprising a tempering system provided with a tempering unit, associated with that storage volume for maintaining a flow of said gaseous medium circulating in said storage volume and passing through said tempering unit in order to be maintained at a defined or set temperature, said tempering unit comprising an internal heat exchanger arranged in said flow of gaseous medium passing through said tempering unit, said tempering system being provided with a refrigerant circuit comprising said internal heat exchanger, an external heat exchanger exposed to ambient air surrounding said container housing as well as a compressor unit for compressing refrigerant, and said tempering system being further provided with an engine for driving said compressor unit in an independent power source mode and further provided with an electric motor/generator unit mechanically coupled, in particular drive couple, to said compressor unit and said compressor unit and said motor/generator unit being commonly driven by said engine in said independent power source mode.

The advantage of the present solution has to be seen in a fact that the provision of an electric motor/generator unit mechanically coupled to said compressor unit enables driving of said motor/generator unit by said engine so that the motor/generator unit can be used as a generator in said independent power source mode.

In another mode the motor/generator unit can be used as a motor for driving said compressor unit, in particular in a case when the engine is not running.

With respect to the mechanical coupling of said motor/generator unit and said compressor unit no further details have been given so far.

For example it would be possible to couple said motor/generator unit and said compressor mechanically by a belt drive or any kind of gear.

An advantageous and in particular cost efficient solution provides that said motor/generator unit and said compressor unit are directly coupled by a shaft.

In this case the shaft could be a specific coupling shaft arranged between said motor/generator unit and said compressor unit.

It is of particular advantage if said motor/generator unit and said compressor unit are driven by a common drive shaft, which is a shaft of said motor/generator unit as well as a shaft of said compressor unit so that the motor/generator unit and the compressor unit can be combined to one commonly driven device.

In order to efficiently cool the motor/generator unit it is of particular advantage if refrigerant flowing in said refrigerant circuit is flowing through said motor/generator unit for cooling said motor/generator unit.

This means that no specific fan is necessary for cooling said motor/generator unit, because the refrigerant flowing in the refrigerant circuit can be used to cool the motor/generator unit. In particular refrigerant supplied from the internal heat exchanger is used for cooling before it is compressed by said compressor.

One advantageous design provides that said motor/generator unit and said compressor unit are arranged in a common housing.

Arranging both units in a common housing has the advantage that the design is very cost efficient and further the arrangement of both units in a common housing enhances the mechanical stability and reliability of the concept.

According to one preferred solution it is provided that said refrigerant to be compressed is flowing through a compartment within said common housing in which said motor/generator unit is arranged, before entering said compressor unit.

In order to have the option to decouple the engine from said compressor unit, one preferred solution provides that a clutch unit is provided for coupling said engine to said compressor unit so that the clutch unit can be released for decoupling the compressor unit from said engine.

The clutch unit can be designed in various manners.

One preferred solution is to use a magnetic clutch as a clutch unit.

The clutch unit can be arranged on various sides of said compressor unit.

For example, the clutch unit could be arranged on a side of said motor/generator unit opposite said compressor unit.

The clutch unit could also be arranged between said compressor unit and said electric motor/generator unit.

One preferred solution provides that said clutch unit is arranged on a side of said compressor unit opposite to said electric motor/generator unit so that the compressor unit is arranged between the clutch unit and the electric motor/generator unit which leads to a favorable mechanical design because the compressor unit can be designed mechanically so as to be driven from one side by the clutch unit via the engine or from the other side by the electric motor/generator unit.

Preferably the clutch unit is arranged on a common drive shaft of said motor/generator unit and said compressor unit.

Said engine could be an engine which for example is a combustion engine or a hydraulic engine which in particular is used for driving a vehicle on which said storage unit is mounted.

However in order to improve the flexibility it is of particular advantage if said engine is adapted to drive said compressor unit and said motor/generator unit only so that the engine is only used for powering the tempering system according to the present invention.

In particular, said engine used for powering said tempering system could be a combustion engine or a hydraulic engine provided with pressurized hydraulic medium from another source, e.g. from a combustion engine of a vehicle.

With respect to the overall design of the storage unit no further details have been given so far.

For maintaining said flow of gaseous medium within said storage volume it is of advantage that at least one fan unit is provided for generating said flow of said gaseous medium within said storage volume and for having said flow passing through said tempering unit.

Said at least one fan unit can be arranged on various places within said storage volume.

One preferred solution provides that said at least one fan unit is comprised by said tempering unit which enables to blow said flow of gaseous medium directly on a heat exchanger unit within said tempering unit.

Further at least one external fan unit is provided in order to generate a flow of ambient air through said external heat exchanger in order to cool hot refrigerant passing through said external heat exchanger.

In particular said external fan unit can be used for cooling said engine.

In order to be able to heat the flow of gaseous medium under certain conditions, in particular extreme low temperatures outside said storage unit, at least one heater is provided in said tempering unit in order to heat said flow of gaseous medium.

In principal the heater can be arranged independent from the internal heat exchanger.

However, in order to use the heater for defrosting, the internal heat exchanger one advantageous solution provides said at least one heater is connected to said internal heat exchanger so that said heater and said internal heat exchanger form a heat exchange unit.

In order to run said storage unit according to the present invention a control is provided for controlling said electric motor/generator unit and said engine during operation of said storage unit.

According to one solution said control controls said electric motor/generator unit and said engine to either run the engine and said motor/generator unit as a generator or to stop the engine and to run the electric motor/generator unit as a motor.

Further it is of advantage if the control is adapted to connect said motor/generator unit to a mains power supply in order to drive said compressor unit by said motor/generator unit operating as a motor and being powered by said mains power supply.

Another solution provides that said control is adapted to connect said mains power supply to at least one of said fan units in order to drive at least one of said fan units by said mains power supply.

Further an advantageous solution provides a control for controlling the flow of refrigerant in said refrigerant circuit and therefore controlling the operation of said refrigerant circuit.

This control could be different from the control mentioned before.

However one preferred solution provides that the control mentioned before is the same as the control for controlling the flow of refrigerant in the refrigerant circuit.

One specific solution provides that in a cooling mode said refrigerant circuit is controlled to cool said heat exchanger in order to cool said flow of gaseous medium in said storage volume.

Further it is provided that in a heating mode said refrigerant circuit is controlled to heat said internal heat exchanger in order to heat said flow of gaseous medium in said storage volume.

This means that in the heating mode compressed hot refrigerant is not fed to the external heat exchanger but to the internal heat exchanger to heat the internal heat exchanger of the refrigerant circuit, in this case the refrigerant circuit is heated by the heat generated by the motor/generator unit and the heat generated in the course of compression of the refrigerant and this heat is then used to heat the internal heat exchanger.

Another solution provides that in a heating mode said control system controls said electric heater in order to heat said flow of gaseous medium in said storage volume.

The object of the present invention is further solved by a tempering system for use in connection with a storage unit, said tempering system being provided with a tempering unit associated with a storage volume for tempering a flow of gaseous medium passing through said tempering unit in order to maintain said flow at a defined or set temperature, said tempering unit comprising an internal heat exchanger arranged within said flow of gaseous medium, said tempering system being provided with a refrigerant circuit comprising said internal heat exchanger, and an external heat exchanger exposed to ambient air, as well as a compressor unit for compressing refrigerant, said tempering unit being further provided with an engine for driving said compressor unit in an independent power source mode, and said tempering system being provided with an electric motor/generator unit mechanically coupled to said compressor unit and said compressor unit, and said motor/generator unit being commonly driven by said engine in said independent power source mode.

The advantage of a tempering system as described before has to be seen in the fact that the system enables to use the electric motor/generator unit as a generator in case the compressor is driven by the engine and it further enables to use the electric motor/generator unit as an electric motor for driving the compressor unit in case the engine is not running and the mains power supply is connected.

Said engine could be an engine which for example is a combustion engine or a hydraulic engine which in particular is used for driving a vehicle on which said storage unit is mounted.

However in order to improve the flexibility it is of particular advantage if said engine is adapted to drive said compressor unit and said motor/generator unit only so that the engine is only used for powering the tempering system according to the present invention.

In particular, said engine used for powering said tempering system could be a combustion engine or a hydraulic engine provided with pressurized hydraulic medium from another source e.g. from a combustion engine of a vehicle.

In general there exist various solutions to mechanically couple the motor/generator unit and the compressor unit.

One particularly simple and advantageous solution provides that said motor/generator unit and said compressor unit are directly coupled by a shaft.

The shaft could be a specific coupling shaft. One preferred solution provides that said motor/generator unit and said compressor unit are driven by a common drive shaft.

In this case the drive shaft of the motor/generator unit and the drive shaft of the compressor unit are formed by the same shaft so that a mechanically simple and reliable solution is provided.

In order to efficiently cool said motor/generator unit and in particular to avoid a cooling fan for said motor/generator unit, according to a preferred solution refrigerant flowing in said refrigerant circuit is flowing through said motor/generator unit for cooling said motor/generator unit.

The motor/generator unit and the compressor unit could be provided in different housings.

One advantageous simple and therefore preferred solution provides that said motor/generator unit and said compressor unit are arranged in a common housing.

In case of using a common housing it is of advantage if said refrigerant to be compressed is flowing through a compartment within said common housing in which said motor/generator unit is arranged before entering said compressor unit.

In order to enable a decoupling of said engine and the compressor unit a clutch unit is provided for coupling or decoupling said engine and said compressor unit.

Said clutch unit can be a mechanically operated clutch unit. One preferred solution provides that said clutch unit is a magnet clutch.

With respect to the mechanical setup one preferred solution provides that said clutch unit is arranged on a side of said compressor unit opposite to said electric motor/generator unit so that the compressor unit can be driven from either side which means either by the engine via the clutch unit or by the electric motor/generator unit.

It is of particular advantage if said clutch unit is arranged on a common drive shaft of said motor/generator unit and said compressor unit.

Further advantages and features of the tempering system are disclosed in connection with the storage unit according to the present invention so that with respect to these features reference is made to the explanations given in connection with the storage unit according to the present invention.

The invention further refers to a compressor system for a gaseous medium, in particular refrigerant, comprising a compressor unit and a motor/generator unit arranged in a common housing, said compressor unit and said motor/generator unit being mechanically drive coupled and provided with an external drive element for enabling driving of said motor/generator unit and said compressor unit by an external drive source.

The advantage of the compressor system as defined before has to be seen in the fact that said compressor system can be used for compressing a gaseous medium driven either by said motor/generator unit if used as a motor and or by said external drive source and in case the compressor unit is driven by said external drive source the external drive source can be also used to drive the motor/generator unit then operated as a generator.

It is also possible to use said compressor unit when provided with pressurized gaseous medium to operate as an expansion unit and to then drive said motor/generator which is in this case operating as a generator.

Arranging both units in a common housing further has the advantage that the design is very cost efficient and further the arrangement of both units in a common housing enhances the mechanical stability and reliability of the concept.

With respect to the mechanical coupling of said motor/generator unit and said compressor unit no further details have been given so far.

For example it would be possible to couple the motor/generator unit and said compressor mechanically by a belt drive or any kind of gear.

An advantageous and in particular cost efficient solution provides that said motor/generator unit and said compressor unit are directly coupled by a shaft.

In this case the shaft could be a specific coupling shaft arranged between said motor generator unit and said compressor unit.

It is of particular advantage if said motor/generator unit and said compressor unit are driven by a common drive shaft, which is a shaft of said motor/generator unit as well as a shaft of said compressor unit so that the motor/generator unit and the compressor unit can be combined to one commonly driven device.

In order to efficiently cool the motor/generator unit it is of particular advantage if gaseous medium flowing to said compressor unit is flowing through said motor/generator unit for cooling said motor/generator unit.

This means that no specific fan is necessary for cooling said motor/generator unit, because the gaseous medium flowing to the compressor unit can be used to cool the motor/generator unit.

According to one preferred solution it is provided that said gaseous medium to be compressed is flowing through a compartment within said common housing in which said motor/generator unit is arranged, before entering said compressor unit.

Said external drive element can be any element which enables to drive said compressor system externally, so as for example any gear element.

In order to have the option to decouple the external drive source from said compressor unit, one preferred solution provides that said external drive element is a clutch unit provided for coupling said engine to said compressor unit so that the clutch unit can be released for decoupling the compressor unit from said external drive source.

The clutch unit can be designed in various manners.

One preferred solution is to use a magnetic clutch as a clutch unit.

The clutch unit can be arranged on various sides of said compressor unit.

For example, the clutch unit could be arranged on a side of said motor/generator unit opposite said compressor unit.

The clutch unit could also be arranged between said compressor unit and said electric motor/generator unit.

One preferred solution provides that said clutch unit is arranged on a side of said compressor unit opposite to said electric motor/generator unit so that the compressor unit is arranged between the clutch unit and the electric motor/generator unit which leads to a favorable mechanical design because the compressor unit can be designed mechanically so as to be driven from one side by the clutch unit via the external drive source or from the other side by the electric motor/generator unit.

Preferably the clutch unit is arranged on a common drive shaft of said motor/generator unit and said compressor unit.

Said external drive source could be an engine which for example is a stationary engine or which is used for driving a vehicle on which said compressor system is mounted.

However in order to improve the flexibility it is of particular advantage if said engine is adapted to drive said compressor unit and said motor/generator unit only so that the engine is only used for powering the tempering system according to the present invention.

In particular, said engine used for powering said compressor system could be a combustion engine or a hydraulic engine provided with pressurized hydraulic medium from another source, e.g. from a combustion engine.

The electric motor/generator unit can be designed in different ways.

One preferred design provides that said motor/generator unit is a synchronous electric machine.

Another preferred solution provides that said motor/generator unit is an asynchronous permanent magnet electric machine.

Further advantages and features of said compressor system are disclosed in connection with the storage unit and the tempering system as described before for which such a compressor system can be used.

Further features and explanations with respect to the present invention are disclosed in connection with the detailed specification and the drawings.

DETAILED DESCRIPTION OF THE INVENTION

Figure 1:
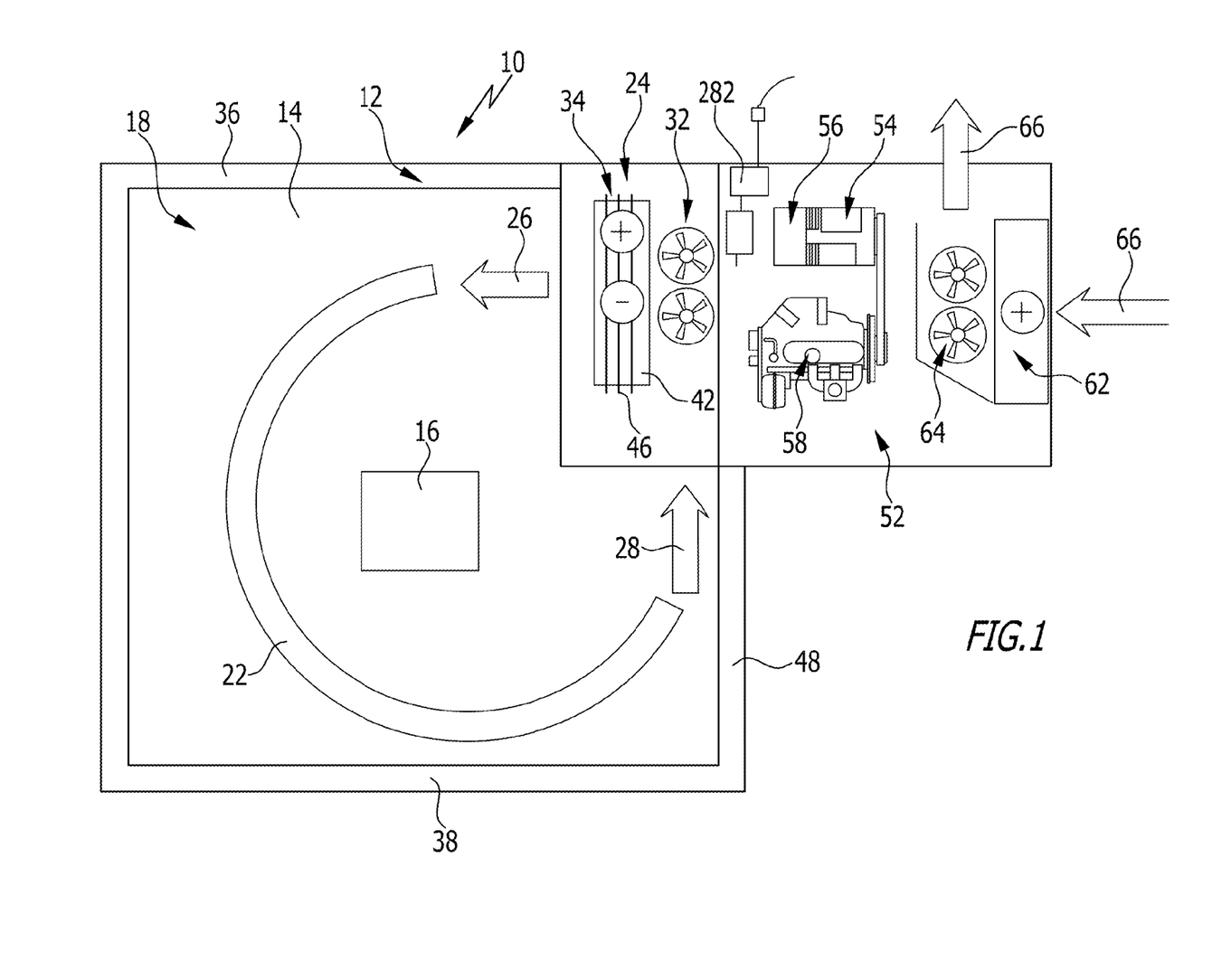
FIG. 1 shows as schematic arrangement of the various features of a storage unit according to the present invention.

A storage unit 10 comprises an insulated container housing 12 enclosing a storage volume 14 within which temperature sensitive freight is received surrounded by a gaseous medium, in particular air, which is kept at a defined temperature level for maintaining said freight 16 in a defined temperature range.

Said storage unit 10 is preferably adapted to be a transportable storage unit, for example for a truck trailer or a railway carriage transporting freight 16 or a conventional container for shipping freight 16 by truck, railway or ship.

In order to maintain a defined or set temperature range of freight 16 a flow 22 of said gaseous medium 18 is circulating through volume 14 starting from a tempering unit 24 as a supply gas flow and entering tempering unit 24 as a return gas flow.

The circulating gas flow 28 is generated by a fan unit 32 preferable arranged within tempering unit 24 and tempered by a heat exchange unit 34 arranged within tempering unit 24.

Preferably supply gas flow 26 exits from tempering unit 24 in an area close to an upper wall 36 of insulated container housing 12 and preferably returns to tempering unit 24 close to a lower wall 38 of insulated container housing 12 forming said return gas flow 28.

Figure 2:
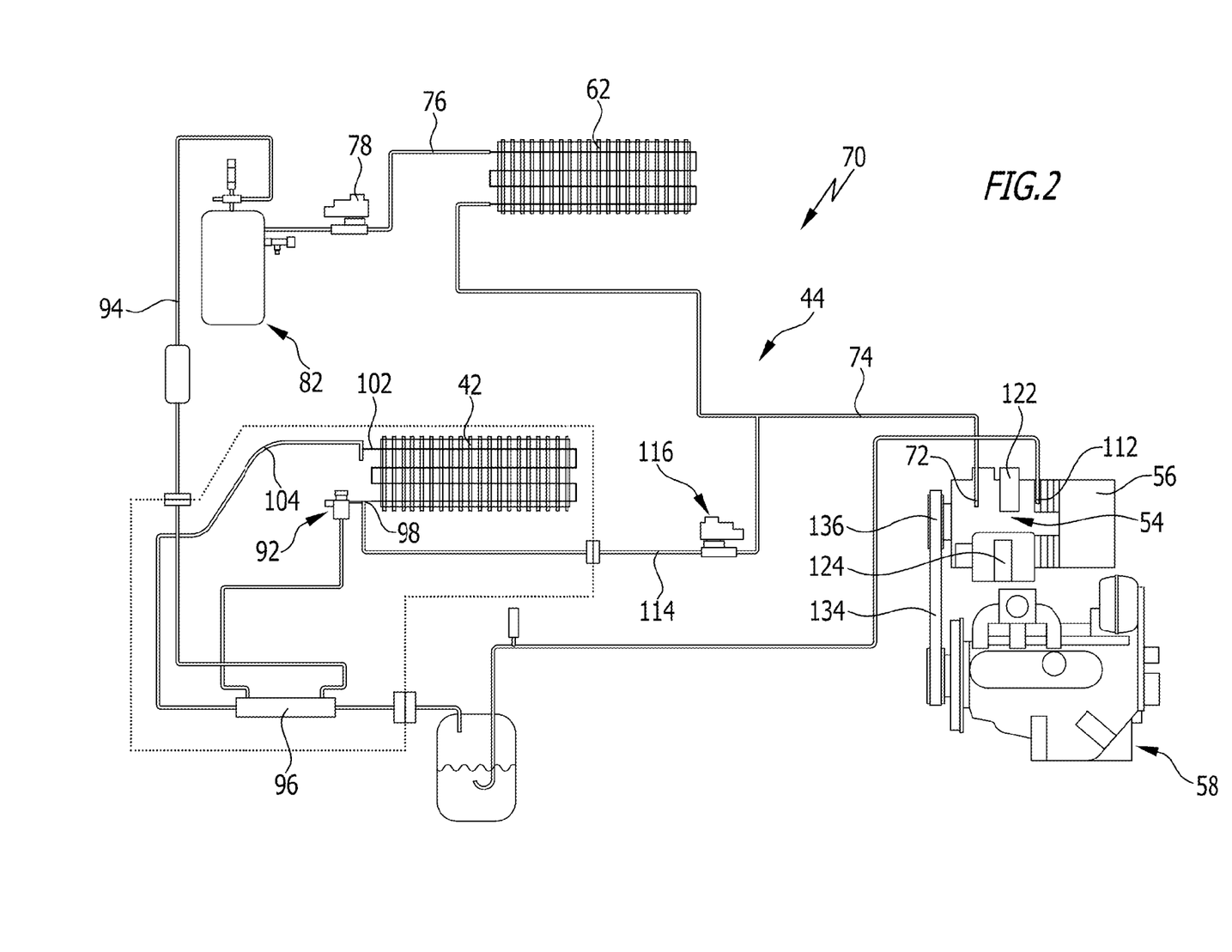
FIG. 2 shows as schematic representation of the refrigerant circuit combined with the motor/generator unit and an FIG. 3 shows a longitudinal sectional view through a compressor system comprising a compressor unit and a motor/generator unit according to the present invention.

According to a preferred embodiment heat exchange unit 34 comprises an internal heat exchanger 42 arranged in a refrigerant circuit 44 as shown in FIG. 2 as well as heaters 46 which are preferably electric heaters.

Tempering unit 24 is arranged close to upper wall 36 of insolated container housing 12, for example on a front wall 48 or a rear wall thereof.

However, tempering unit 24 can also be arranged on upper wall 36.

An equipment box 52 comprising a compressor unit 54 a motor/generator unit 56 as well as an engine 58, in particular a combustion engine, is preferably arranged close to tempering unit 24 on insulated container housing 12. Equipment box 52 further comprises an external heat exchanger 62 as well as an external fan unit 64 generating an air flow 66 through external heat exchanger 72.

As can be seen from FIG. 2 compressor 54 as well as external heat exchanger 62 are arranged in refrigerant circuit 44 in addition to internal heat exchanger 42.

The components of refrigerant circuit 44 and engine 58 as well as motor/generator unit 56 together form a tempering system 70 as shown in FIG. 2.

In particular compressor unit 54 with its discharge port 72 is connected to a discharge line 74 of refrigerant circuit 44 guiding refrigerant compressed at compressor 54 to external heat exchanger 62 in which hot compressed refrigerant is cooled by external air flow 66.

Cooled compressed refrigerant leaves external heat exchanger 62 via high pressure lines 76 and enters a liquid receiver 82.

Preferably high pressure line 76 is provided with a valve 78 enabling to control supply of high pressure refrigerant to liquid receiver 82.

Liquid receiver 82 is further connected to expansion device 92 by liquid refrigerant line 94 guiding liquid refrigerant from liquid receiver 82 to expansion device 92.

Preferably a suction line heat exchanger 96 is arranged within liquid refrigerant line 94 in order to subcool liquid refrigerant before expansion in expansion device 92.

Expansion device 92 feeds expanded refrigerant to input port 98 of heat exchanger 42 so that in heat exchanger 42 expanded and cooled refrigerant is able to receive heat before exiting to output port 102 of heat exchanger 42 and entering suction line 104 which after passing through suction line heat exchanger 96 is connected to suction port 112 of compressor 54.

Refrigerant circuit 44 further comprises a hot gas supply line 114 branching off from discharge line 74 and being connected with input port 98 of heat exchanger 42.

Hot gas supply line 114 is further provided with hot gas supply valve 116 which enables to close our open hot gas supply line 114.

In order to control the capacity of or mass flow through compressor unit 54, compressor unit 54 is provided with two capacity control valves 122 and 124 which enable control of the compressor capacity, for example, between 100% compressor capacity if both capacity control valves 122, 124 are open, 50% compressor capacity if one compressor control valve 122 is open and the other compressor control valve 124 is closed, and 0% if both compressor control valves 122, 124 are closed.

As shown in FIG. 2 compressor unit 54 can be driven by an internal engine 58 driving for example a belt drive 134 which then drives a clutch unit 136 connected with compressor unit 54.

Figure 3:
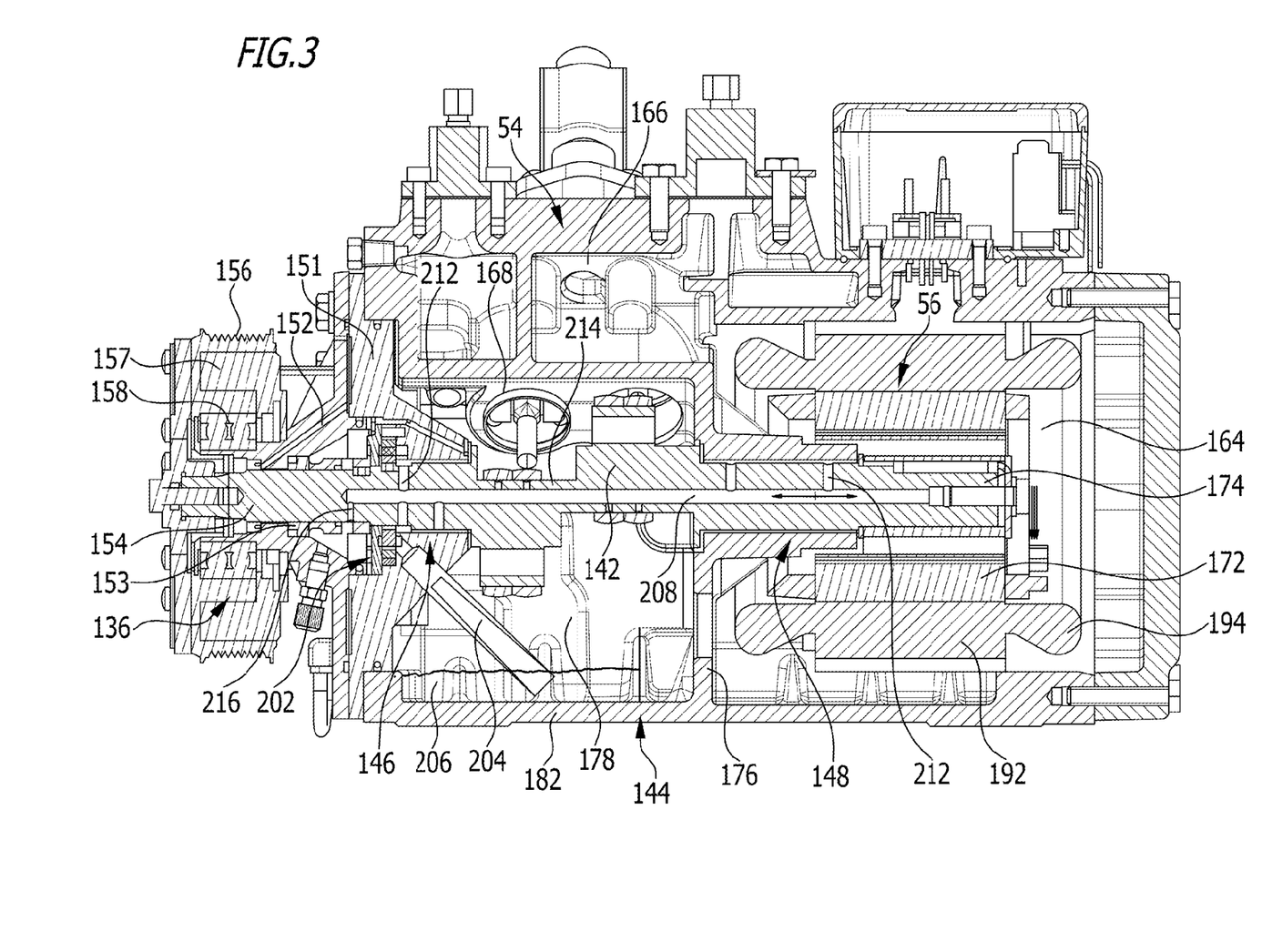

As can be seen from FIG. 3 preferably clutch unit 136 is connected with a common drive shaft 142 of said compressor unit 54 and said motor/generator unit 56 extending in a common housing 144 of said compressor unit 54 and said motor/generator unit 56 and guided by two bearing units 146 and 148 within common housing 144.

For example a first axial and radial bearing unit 146 is arranged in a bearing cover 151 mounted on said common housing 144 and receiving radial and axial forces acting on drive shaft 146. On bearing cover 151 a front cover 152 of common housing 144 is mounted and drive shaft 142 extends through bearing cover 151 and front cover 152 with a shaft section 154.

Front cover 152 is provided with shaft seal 153 in order to prevent lubricant from leaving common housing 144 by passing along shaft section 154.

On shaft section 154 clutch unit 136 is arranged, which clutch unit 136 enables to connect or disconnect shaft section 154 with belt pulley 156 which, for example, surrounds clutch unit 136.

Preferably clutch unit 136 is held in place by front cover 152.

In particular belt pulley 156 is supported by front cover 152 via bearing 157 in order to receive the forces acting on pulley 156 by front cover 152 and avoid or reduce transverse forces acting on shaft section 154 to increase lifetime of shaft seal 153 and bearing 146.

Further front cover 152 is also carrying stationary coil unit 158 necessary for actuation of clutch unit 136 by applying magnetic force.

In the preferred embodiment as shown in FIG. 3 compressor unit 54 is a semi hermetic compressor having motor/generator unit 56 arranged within said common housing 144 and motor/generator unit 56 is arranged in a compartment 164 of common housing 144 through which refrigerant entering through suction port 112 is drawn before entering a suction manifold 166 of compressor unit 54 from which the refrigerant enters the respective compressor elements 168 of compressor unit 54 in order to be compressed.

Figure 4:
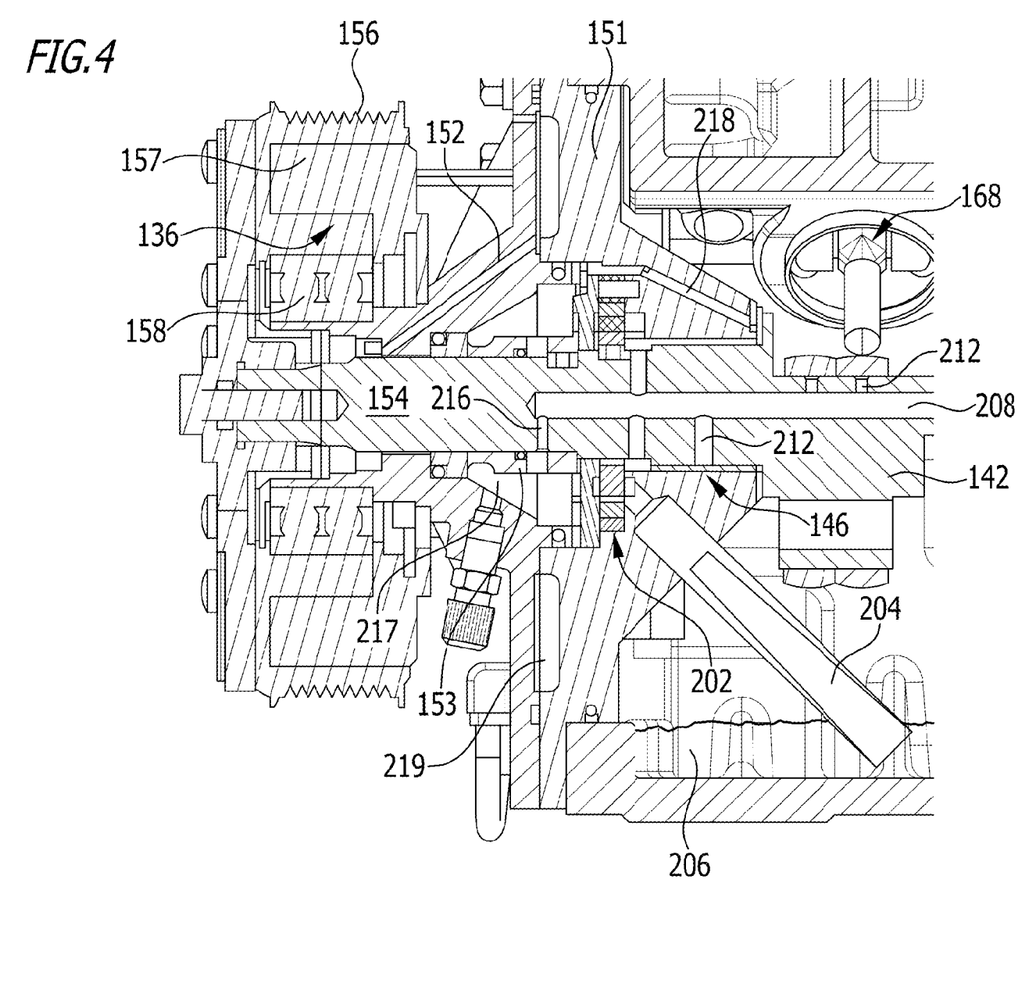
FIG. 4 shows an enlarged sectional view through the arrangement of the electric clutch and a lubricant pump of the compressor unit according to FIG. 3.

In the example shown in FIGS. 3 and 4 compressor elements 168 are cylinders of a piston compressor, however compressor elements 168 can any kind of compressor elements such as for example scroll elements of a scroll compressor or screw elements of a screw compressor.

In the embodiment shown in FIG. 3 motor/generator unit 56 comprises a rotor 172 sitting on a shaft section 174 of common shaft 142 which extends beyond bearing unit 148 which bearing unit 148 is arranged in a central housing section 176 separating the compartment 164 receiving motor/generator unit 56 from an interior space 178 of a drive housing 182 of common housing 144 within which drives for compressor elements 168 are arranged.

Rotor 172 is surrounded by a stator 192 of motor/generator unit 56 which stator 192 is fixedly arranged in common housing 144 and which stator 192 is provided with electrical windings 194 whereas rotor 172 is preferably free of windings.

Motor/generator unit 56 can be designed without permanent magnets or with permanent magnets.

In order to provide sufficient lubricant to various bearing locations of drive shaft 142 a pumping unit 202 is arranged on a section of drive shaft 142 extending beyond bearing unit 146 arranged in bearing cover 151 which pumping unit 202 is connected with a suction tube 204 extending into a lubricant sump 206 formed within a lower part of interior space 178.

Pumping unit 202 is pumping lubricant to a central lubricant channel 208 extending along drive shaft 142.

Within drive shaft 142 distribution channels 212 are provided which branch off from central lubricant channel 208 and guide lubricant to various bearing locations, for example to bearing units 146 and 148 as well as various cam drives 214 for driving compressor elements 168.

In particular a further distribution channel 216 is supplying lubricant to shaft seal 153 in order to cool shaft seal 153 and such lubricant is collected in a chamber 217 surrounding shaft seal 153 and guided to interior space 178 via channel 218.

Lubricant leaking through shaft seal 153 is collected in a chamber 218 arranged between front cover 152 and bearing cover 151.

Figure 5:
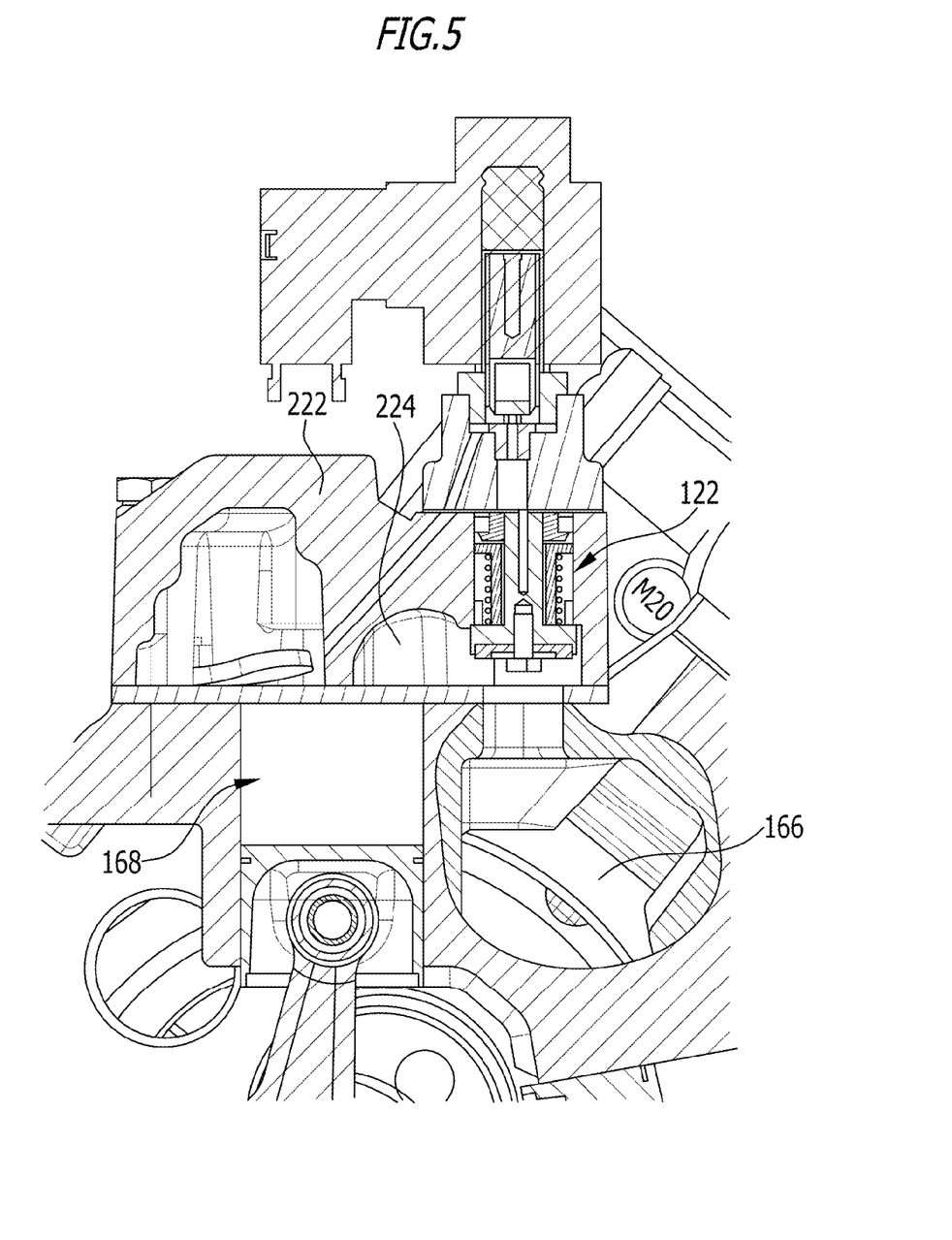
FIG. 5 shows a sectional view through a suction manifold and a cylinder head of a compressor unit according to the present invention.

As shown for example in FIG. 5 in case of compressor elements 168 comprising cylinders capacity control valves 122 are arranged in a cylinder head 222 in order to control flow of refrigerant from suction manifold 166 into the respective suction chamber 224 of the respective cylinder head 222.

If the respective capacity control valve 122 or 124 is closed, flow of refrigerant from suction manifold 166 to the respective suction chamber 224 is interrupted so that the respective compressor element 168 is prevented from compressing refrigerant and no mass flow through said compressor element 168 occurs.

Figure 6:
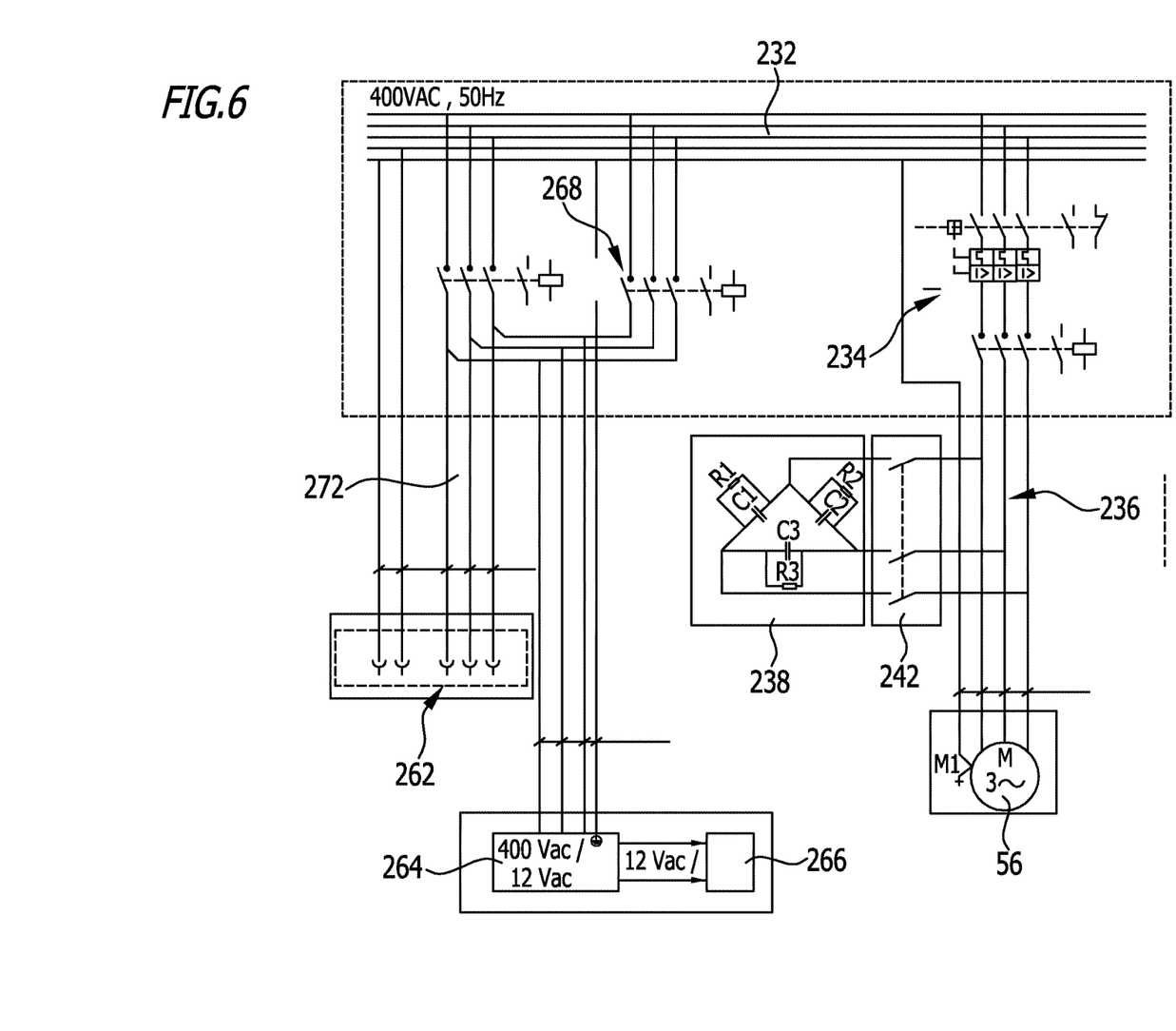
FIG. 6 shows a schematic representation of one part of an internal power distribution network together with the motor generator unit, a battery and a connection to a mains power supply

As for example shown in FIG. 6 motor/generator unit 56 is electrically connected to an internal power distribution network 232 via switching unit 234.

For example internal power distribution network 232 is a 400 Volt alternating current network having three phases and motor/generator unit 56 is also connected via a three phase line 236 to internal power distribution network 232.

Further a capacitor network 238 can be electrically connected to three phase power line 236 by closing a capacitor switching unit 242 which capacitor network 238 is used when motor/generator unit 56 is operated as a generator whereas in case motor/generator unit 56 is operated as a motor capacitor network 238 is switched off by opening by capacitor switching unit 242.

In case motor/generator unit 56 is provided with permanent magnets capacitor network 238 and capacitor switching unit 242 are not necessary.

Figure 7:
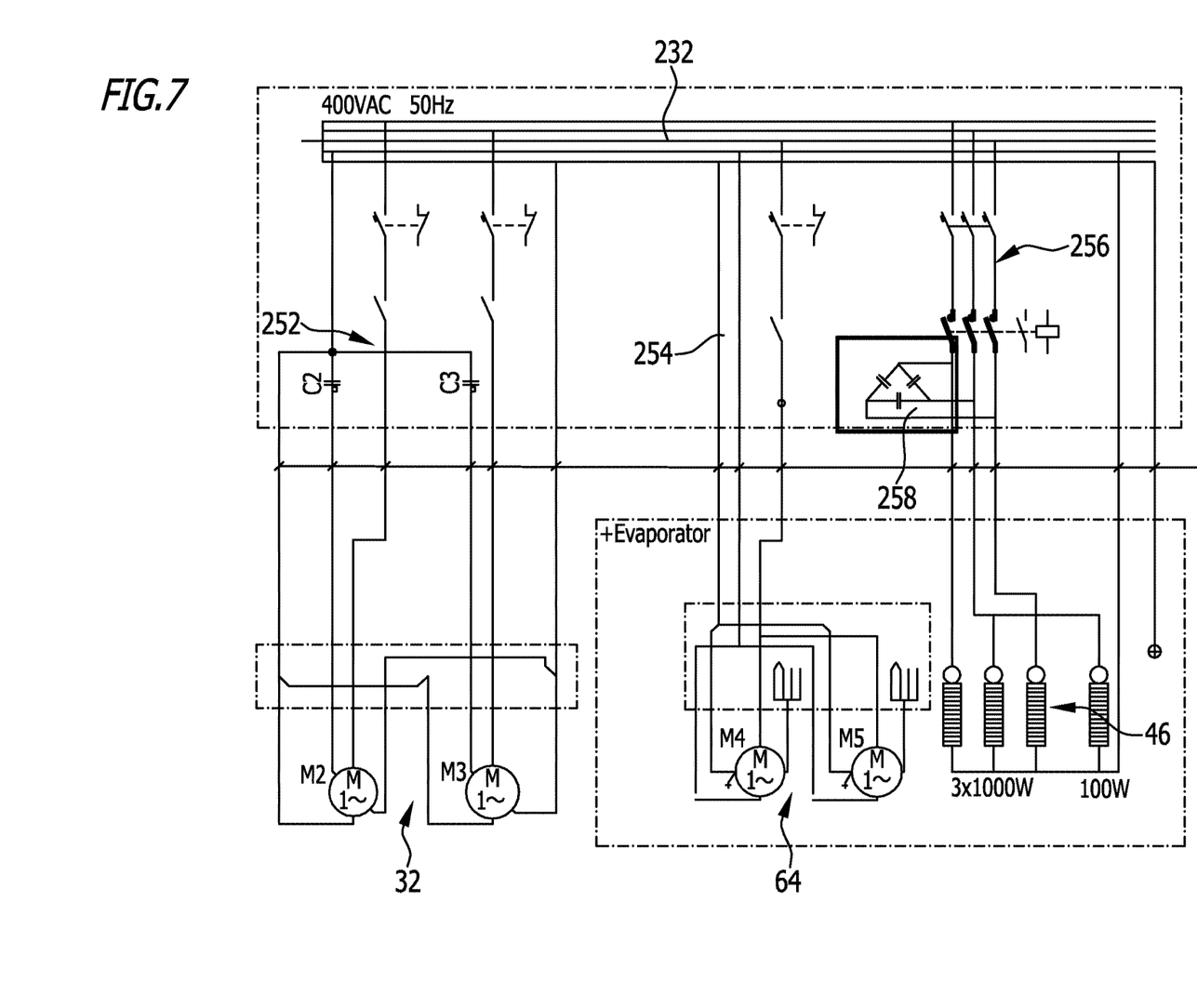
FIG. 7 shows a schematic representation of another part of the internal power distribution network together with electric heaters and fan units coupled thereto.

As shown in FIG. 7 fan unit 32 can be electrically connected to internal power distribution network 232 by switching unit 252 and also external fan unit 64 can be connected to internal power distribution network 232 by switching unit 254.

Further electrical heaters 46 can be electrically connected to internal power distribution network 232 by switching unit 256.

In particular electrical heaters 46 are connected to a capacitor network 258 used to match the impedance of electrical heaters 46 to internal power distribution network 232.

Further internal power distribution network 232 can be connected to a mains power supply 262 in case storage unit 10 is operated standby power source mode so that a connection to a mains power supply 262 is possible.

In addition a power converter 264 is used in order to connect internal power distribution network 232 with a battery 266 for storing electrical power.

Preferably power convertor 264 can be electrically connected by a switching unit 262 to internal power distribution network 232.

Further power convertor 264 is directly connected to a power line 272 extending between mains power supply 262 and internal power distribution network 232.

In order to operate storage unit 10 a control 282 is provided which controls operation of engine 58, clutch 136, capacity control valves 122, 124, motor/generator unit 56, and in particular by switching units 234 and 242 as well as switching units 252,254 and 268.

A storage unit 10 as described before can be operated in various operation modes.

In case storage unit 10 is operated in an independent power source mode and therefore independent from mains power supply 262 engine 58 is running and drives drive shaft 142 via belt drive 134 with having clutch unit 136 connecting belt drive 134 to drive shaft 142.

Since drive shaft 142 is a common drive shaft for compressor unit 54 as well as motor/generator unit 56 engine 58 drives compressor unit 54 as well as motor/generator unit 56 and in this case motor/generator unit 56 will operate as a generator.

Therefore switching unit 234 connects motor/generator unit 56 with internal power distribution network 232 and capacity switching unit 242 connects capacity network 238 to motor/generator unit 162 in order to provide appropriate impedance adaption for feeding internal power distribution network 232 with electric power from motor/generator unit 56.

Electric power generated by motor/generator unit 56 is used for driving fan unit 32 for maintaining flow 22 of gaseous medium inside storage volume 14 as well as fan unit 64.

In this independent power source mode various operational modes are possible.

One operational mode is the cooling mode in which refrigerant compressed by compressor unit 54 is supplied to external heat exchanger 62, cooled therein and then supplied to liquid receiver 82 and further to expansion device 92 in order to supply expanded and cold refrigerant to input port 98 of heat exchanger 42. Heat exchanger 42 being cooled by cold refrigerant can receive heat from circulating flow 22 of gaseous medium and cool the gaseous medium 18 circulating within storage volume 14. In this cooling mode of refrigerant circuit 44 valve 78 is open in order to supply refrigerant under high pressure to liquid receiver 82 and hot gas supply valve 116 is closed in order to block supply of hot gas to input port 98 via hot gas supply line 114.

If however the ambient air is too cold it could be necessary to heat gaseous medium 18 within storage volume 14 in order to avoid that freight 16 is cooled down to an undesired temperature level at which freight 16 might be damaged or might perish.

In this case it is necessary to heat the circulating flow 22 of gaseous medium 18 by operating tempering unit 24 in the heating mode.

For operating in the heating mode there are two possibilities.

One heating possibility would be to operate heaters 46 by closing switching unit 256 and to stop cooling by closing valve 78.

In order to reduce the capacity of compressor unit 54 to 0% capacity control valves 122 and 124 are closed so that no refrigerant is compressed anymore by compressor unit 54 even though this compressor unit 54 is still running.

Alternatively or additionally another heating possibility would be to run compressor unit 54 with a capacity above 0%, e.g. with a capacity of 50% or 100% but to direct the compressed and heated refrigerant from discharge line 74 not to external heat exchanger 62 but by via hot gas supply line 114 to input port 98 of heat exchanger 42.

In this case the hot refrigerant, in particular heated by the compression process in compressor unit 54, is flowing through heat exchanger 42 and therefore internal heat exchanger 42 is heated by hot refrigerant, irrespective of whether or not electric heaters 46 are operated so that the circulating flow 22 of gaseous medium is heated.

For heating internal heat exchanger 42 with hot refrigerant valve 78 is closed so that no compressed refrigerant from external heat exchanger 62 enters liquid receiver 82 and further no liquid is fed to expansion device 92 which is inoperable in this case.

In addition the heat generated by motor/generator unit 56 is transported by the refrigerant passing through compartment 174 to internal heat exchanger 42 by the compressed hot refrigerant outputted by compressor unit via discharge port 72.

Therefore the heat generated by motor/generator unit 56 running as a generator can be used for heating the flow 22 of gaseous medium.

It is further possible to run tempering unit 24 in a defrost mode in which fan unit 32 is switched off and heat exchanger 42 can be defrosted either by using hot refrigerant, supplied via hot gas supply line 114 or by using heaters 46 for heating heat exchanger 42.

In case only heaters 46 are used for heating heat exchanger 42 capacity charge control valves 122 and 124 can be closed in order to run compressor unit 54 with 0% capacity, e.g. 0% mass flow.

If control unit 282 detects that the flow 22 of gaseous medium 18 within storage volume 14 has reached its determined or set temperature, storage unit 10 can be run in an idling mode.

In the idling mode one possibility is to run engine 132 at reduced or low speed in order to reduce fuel consumption.

In this case engine 132 still drives compressor unit 54 as well as motor/generator unit 56.

The power generated by motor/generator unit 56 operating as a generator is used to run fan unit 32 for maintaining the circulating of the flow 22 of gaseous medium 18 within storage volume 14. However it is possible to close both capacity control valves 122, 124 in order to reduce the capacity of compressor unit 54 to 0%.

Further external fan unit 64 can still be active in order to cool engine 58.

In the idling mode it is also possible to stop engine 58 in case the desired or set temperature level of the flow 22 of gaseous medium 18 has been reached. In order to maintain operation of fan unit 32 for circulating flow 22 of gaseous medium 22 battery 266 can be used to supply the necessary power to fan unit 32 via power distribution network 232.

If storage unit 10 is used in a standby power source mode in which mains power supply 262 can be connected to internal power distribution network 232 engine 58 is stopped and clutch unit 136 is released in order to decouple drive shaft 142 from engine 58.

In this case motor/generator unit 56 is operated as a motor and capacitor switching unit 242 is used to decouple capacitor network 238 from motor/generator unit 56.

In this standby power source mode it is possible to operate storage unit 10 in the cooling mode, the heating mode, defrost mode and the idling mode however in this case compressor unit 54 is always driven by motor/generator unit 56 operating as a drive motor for compressor unit 54 and all the electric power necessary for the respective mode, for example for operating motor/generator unit 56, fan unit 132, external fan unit 62 and heaters 46, is supplied by mains power supply 262.

The invention claimed is:

1. Storage unit comprising
a container housing enclosing a storage volume for receiving freight and a gaseous medium surrounding said freight, said storage unit further comprising a tempering system provided with a tempering unit associated with said storage volume for maintaining a flow of said gaseous medium circulating in said storage volume and passing through said tempering unit in order to be maintained at a defined or set temperature, said tempering unit comprising an internal heat exchanger arranged in said flow of gaseous medium passing through said tempering unit, said tempering system being provided with a refrigerant circuit comprising said internal heat exchanger, an external heat exchanger exposed to ambient air surrounding said container housing as well as a
compressor unit for compressing refrigerant, and said tempering system being further provided with an engine for driving said compressor unit in an independent power source mode and said tempering system being further provided with an electric motor or electric generator unit mechanically coupled to said compressor unit, and said compressor unit and said electric motor or electric generator unit being commonly driven by said engine in said independent power source mode.

2. Storage unit according to claim 1, wherein said electric motor or electric generator unit and said compressor unit are directly coupled by a shaft.

3. Storage unit according to claim 1, wherein said electric motor or electric generator unit and said compressor unit are driven by a common drive shaft.

4. Storage unit according to claim 1, wherein refrigerant flowing in said refrigerant circuit is flowing through said electric motor or electric generator unit for cooling said electric motor or electric generator unit.

5. Storage unit according to claim 1, wherein said electric motor or electric generator unit and said compressor unit are arranged in a common housing.

6. Storage unit according to claim 1, wherein said refrigerant to be compressed is flowing through a compartment within said common housing in which said electric motor or electric generator unit is arranged, before entering said compressor unit.

7. Storage unit according to claim 1, wherein a clutch unit is provided for coupling said engine to said compressor unit.

8. Storage unit according to claim 7, wherein said clutch unit is arranged on a common drive shaft of said electric motor or electric generator unit and said compressor unit.

9. Storage unit according to claim 1, wherein said clutch unit is a magnetic clutch.

10. Storage unit according to claim 1, wherein said clutch unit is arranged on a side of said compressor unit opposite to said electric motor or electric generator unit.

11. Storage unit according to claim 1, wherein said engine is a combustion engine or a hydraulic engine.

12. Storage unit according to claim 1, wherein said electric motor or electric generator unit is a synchronous or an asynchronous permanent magnet electric machine.

13. Storage unit according to claim 1, wherein at least one fan unit is provided for generating a flow of said gaseous medium within said storage volume and for having said flow passing through said tempering unit.

14. Storage unit according to claim 13, wherein said at least one fan unit is comprised by said tempering unit.

15. Storage unit according to claim 1, wherein at least one external fan unit is provided in order to generate a flow of ambient air through said external heat exchanger.

16. Storage unit according to claim 1, wherein at least one heater is provided in said tempering unit in order to heat said flow of gaseous medium.

17. Storage unit according to claim 16, wherein said at least one heater is connected to said internal heat exchanger.

18. Storage unit according to claim 1, wherein a control unit for controlling said electric motor or electric generator unit and said engine is provided.

19. Storage unit according to claim 18, wherein said control controls said electric motor or electric generator unit and said engine to either run the engine and said electric motor or electric generator unit as a generator or to stop the engine and to run the electric motor or electric generator unit as a motor.

20. Storage unit according to claim 18, wherein the control is adapted to connect said electric motor or electric generator unit to a mains power supply in order to drive said compressor unit by said electric motor or electric generator unit operating as a motor.

21. Storage unit according to claim 18, wherein said control is adapted to connect said mains power supply to at least one of said fan units in order to drive said at least one of said fan units by said mains power supply.

22. Storage unit according to claim 1, wherein a control controls the flow of refrigerant in said refrigerant circuit.

23. Storage unit according to claim 22, wherein in a cooling mode said refrigerant circuit is controlled to cool said heat exchanger in order to cool said flow of gaseous medium in said storage volume.

24. Storage unit according to claim 22, wherein in a heating mode said refrigerant circuit is controlled to heat said internal heat exchanger in order to heat said flow of gaseous medium in said storage volume.

25. Storage unit according to claim 1, wherein in a heating mode a control system controls said electric heater in order to heat said flow of gaseous medium in said storage volume.

26. A tempering system for use in connection with a storage unit, said tempering system being provided with a tempering unit associated with a storage volume for tempering a flow of gaseous medium passing through said tempering unit in order to maintain said flow at a defined or set temperature, said tempering unit comprising an internal heat exchanger arranged in said flow of gaseous medium, said tempering system being provided with a refrigerant circuit comprising said internal heat exchanger, an external heat exchanger exposed to ambient air, as well as a compressor unit for compressing refrigerant, and said tempering system being further provided with an engine for driving said compressor unit in an independent power source mode, and said tempering system being provided with an electric motor or electric generator unit mechanically coupled to said compressor unit, and said compressor unit and said electric motor or electric generator unit being commonly driven by said engine in said independent power source mode.

27. Tempering system according to claim 26, wherein said electric motor or electric generator unit and said compressor unit are directly coupled by a shaft.

28. Tempering system according to claim 26, wherein said electric motor or electric generator unit and said compressor unit are driven by a common drive shaft.

29. Tempering system to claim 26, wherein refrigerant flowing in said refrigerant circuit is flowing through said electric motor or electric generator unit for cooling said electric motor or electric generator unit.

30. Tempering system according to claim 26, wherein said electric motor or electric generator unit and said compressor unit are arranged in a common housing.

31. Tempering system according to claim 26, wherein said refrigerant to be compressed is flowing through a compat intent within said common housing in which said electric motor or electric generator unit is arranged before entering said compressor unit.

32. Tempering system according to claim 26, wherein a clutch unit is provided for coupling or decoupling said engine and said compressor unit.

33. Tempering system according to claim 26, wherein said clutch unit is arranged on a side of said compressor unit opposite to said electric motor or electric generator unit.

34. Tempering system according to claim 32, wherein said clutch unit is arranged on a common drive shaft of said electric motor or electric generator unit and said compressor unit.

35. Compressor system for a gaseous medium comprising a compressor unit and an electric motor or electric generator unit arranged in a common housing, said compressor unit and said electric motor or electric generator unit being mechanically drive-coupled and provided with an external drive element for enabling driving of said electric motor or electric generator unit and said compressor unit by an external drive source, wherein the external drive source is an engine arranged to drive only the compressor unit and electric motor or electric generator, and wherein the gaseous medium flowing to said compressor unit flows through said electric motor or electric generator unit for cooling said electric motor or electric generator unit.

36. Compressor system according to claim 35, wherein said electric motor or electric generator unit and said compressor unit are directly coupled by a shaft.

37. Compressor system according to claim 35, wherein said electric motor or electric generator unit and said compressor unit are driven by a common drive shaft.

38. Compressor system for a gaseous medium comprising a compressor unit and an electric motor or electric generator unit arranged in a common housing, and compressor unit and said electric motor or electric generator unit being mechanically drive-coupled and provided with an external drive element for enabling driving of said electric motor or electric generator unit and said compressor unit by and external drive source, wherein the gaseous medium flowing to said compressor unit flows through said electric motor or electric generator unit for coding said electric motor or electric generator unit wherein said gaseous medium to be compressed is flowing through a compartment within said common housing in which said electric motor or electric generator unit is arranged, before entering said compressor unit.

39. Compressor system for a gaseous medium comprising a compressor unit and an electric motor or electric generator unit arranged in a common housing, said compressor unit and said electric motor or electric generator unit being mechanically drive-coupled and provided with an external drive element for enabling driving of said electric motor or electric generator unit and said compressor unit by and external drive source, wherein the gaseous medium flowing to said comporssor unit flows through said electric motor or electric generator unit for cooling said electric motor or electric generator unit wherein said external drive element is a clutch unit provided for coupling said external drive source to said compressor unit.

40. Compressor system according to claim 39, wherein said clutch unit is a magnetic clutch.

41. Compressor system according to claim 39, wherein said clutch unit is arranged on a side of said compressor unit opposite to said electric motor or electric generator unit.

42. Compressor system according to claim 39, wherein said clutch unit is arranged on a common drive shaft of said electric motor or electric generator unit and said compressor unit.

43. Compressor system according to claim 39, wherein said external drive source is a combustion engine or a hydraulic engine.

44. Compressor system for a gaseous medium comprising a compressor unit and an electric motor or electric generator unit arranged in a common housing, said compressor unit and said electric motor or electric generator unit being mechanically drive-coupled and provided with an external drive element for enabling driving of said electric motor or electric generator unit and said compressor unit by an external drive source, wherein the external drive source is an engine arranged to drive only the compressor unit and electric motor or electric generator, and wherein the gaseous medium flowing to said compressor unit flows through said electric motor or electric generator unit for cooling said electric motor or electric generator unit, wherein said electric motor or electric generator unit is a synchronous or an asynchronous permanent magnet electric machine.

* * * * *